United States Patent [19]

Rätzsch et al.

[11] Patent Number: 4,975,522
[45] Date of Patent: Dec. 4, 1990

[54] CROSSLINKABLE COMPOUNDS AND METHOD FOR MAKING

[75] Inventors: Manfred Rätzsch; Karin Grasshoff, both of Dresden, German Democratic Rep.

[73] Assignee: Adademie der Wissenschaften der DDR, Berlin, German Democratic Rep.

[21] Appl. No.: 357,022

[22] Filed: May 25, 1989

[30] Foreign Application Priority Data

Jun. 7, 1988 [DD] German Democratic Rep. ... 316482
Jun. 7, 1988 [DD] German Democratic Rep. ... 317043

[51] Int. Cl.$^5$ ............................................. C08G 63/02
[52] U.S. Cl. ..................... 528/272; 528/274; 528/290; 528/292; 528/295; 528/298; 528/302; 528/304; 528/306; 528/370; 528/373; 525/420; 525/425; 525/432; 525/433; 525/437; 525/444; 525/445; 525/450; 525/451
[58] Field of Search ............... 528/272, 274, 290, 292, 528/295, 298, 302, 304, 306, 370, 373; 525/420, 425, 432, 433, 437, 444, 445, 450, 451

[56] References Cited

U.S. PATENT DOCUMENTS

| 3,809,679 | 4/1970 | Lenz et al. | 528/185 |
| 4,070,433 | 1/1978 | Miyoshi et al. | 264/233 |
| 4,073,777 | 2/1978 | O'Neill et al. | 528/295 |
| 4,272,625 | 6/1981 | McIntyre et al. | 528/183 |

FOREIGN PATENT DOCUMENTS 0063880  3/1982  European Pat. Off. .

Primary Examiner—Morton Foelak
Assistant Examiner—Sam A. Acquah
Attorney, Agent, or Firm—Schweitzer & Cornman

[57] ABSTRACT

The invention relates to linear, thermotropic crosslinkable polymers, which comprises (A) polycondensing a complex dicarboxylic dichloride having the formula

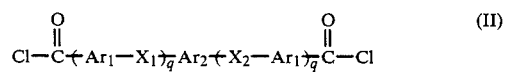

wherein Ar₁ is

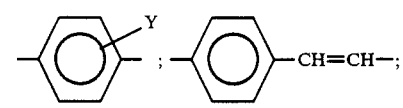

Ar₂ is

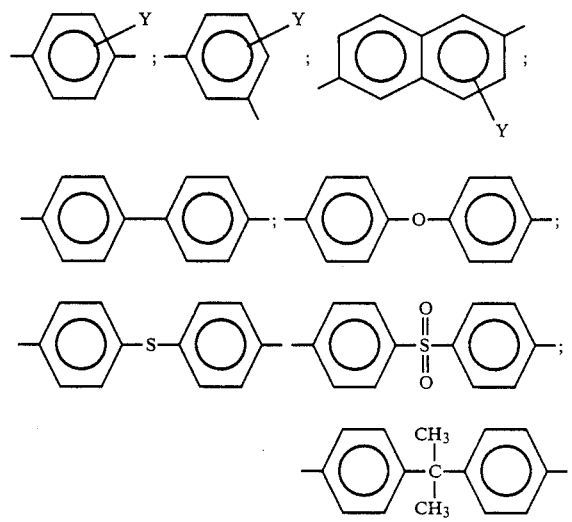

$Y$ is H, F, Cl, CN, phenyl, $C_nH_{2n+1}$, or $OC_nH_{2n+1}$,
$q$ is a cardinal number between 1 and 2, and
$n$ is a cardinal number between 1 and 4;
provided that when $X_1$=OCO, then $X_2$=COO, when $X_1$=COO, then $X_2$=OCO, when $X_1$=NHCO then $X_2$=COHN, and when $X_1$=CONH then $X_2$=NHCO;

(B) with an unsaturated dihydroxy oligomeric compound of the formula (III)

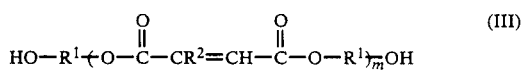

present as an oligomer, where $R^1$ is a linear, aliphatic, saturated, $C_{2-12}$ moiety, or a $C_{4-10}$ oxyaliphatic moiety; $R^2$ is H or $CH_3$ moiety; and
$m$ is a cardinal number between 1 and 4; at a mole ratio of from about 1:5 to about 5:1, at a temperature of from about 140° C. to about 240° C., for a time period from about 0.5 to about 4 hours, under inert gas atmosphere, and crosslinking the polyester reaction product at a temperature from about 140° C. to about 180° C. with a crosslinking agent known per se and being present in a molar ratio of from about 1:20 to about 20:1 per mole double bond in the polymer.

6 Claims, No Drawings

CROSSLINKABLE COMPOUNDS AND METHOD FOR MAKING

FIELD OF THE INVENTION

The invention is directed to a method for the synthesis of regular, linear, thermotropic, crosslinkable compounds with mesogenic units and flexible spacers in the main polymer chain, particularly of polyesters or polyester amides, which are obtained by high temperature solution polycondensation. The invention is of particular utility where special materials of high strength, thermal stability and simple processability are required.

BACKGROUND OF THE INVENTION

Various linear, thermotropic polymers are known. These also include polyesters or polyester amides, which form an anisotropic melt and, through processing from this melt, lead to products with particularly advantageous mechanical properties, such as high strengths and a high modulus (see for example European patents Nos. 63,880, 67,032, 81,900, and 7,715, and U.S. Pat. Nos. 4,393,191, 4,184,996, 4,473,682, 4,351,917, and 4,272,625). The molded objects, films and yarns of thermotropic polymers are, of course, stable only up to temperature below their polymer melting point. Therefore, attempts were made to fix the shape of liquid crystalline polyesters after they were processed, while retaining their advantageous properties, either by drastically increasing the melting point or by making the polymers infusible. A known method involves the subsequent tempering of the processed polymer at temperatures just below the melting point for several hours. This leads to an increase in molecular weight and thus also to higher melting points (see for example U.S. Pat. No. 4,066,620, 4,473,682, 4,499,259 and 4,500,699).

A different possibility is the fixation of the polymers by crosslinking. Fully aromatic, thermotropic polyesters which, after being molded, are cross linked oxidatively by being heated in an oxygen atmosphere, are disclosed e.g. in U.S. Pat. No. 4,224,433. The degradation reactions of the polymer, which take place at the same time, are a disadvantage. In U.S. Pat. No. 4,350,809, polymers including polyesters are described, which form anisotropic melts and have so-called "self cross linking" reactants in the polymer chain. These are monomeric components generally with three or more reactive hydroxyl, carboxyl, amino, isocyanate or carodimide groups or combinations of these. In U.S. Pat. No. 4,147,043, polymers are disclosed, which are synthesized by addition polymerization of monoethylenically unsaturated monomers, and contain compounds with two ethylenic, unsaturated groups, such as p-divinylbenzene, allyl acrylate, diallyl maleate or fumarate, etc., as cross linking agents. Only a very small amount of cross linking agent can be used (0.01 to 5%), since the polymers cross link already during the synthesis and higher amounts lead to a solid, which cannot be processed further.

Furthermore, liquid crystalline, fully aromatic polymers with stilbene or tolan units in the main polymer chain are disclosed e.g. in U.S. Pat. No. 4,654,412, which can be cross linked by electron acceptor monomers, such as maleic acid, maleic anhydride, fumaric acid, or itaconic acid. The high melting and processing temperatures, as well as the high melt viscosity of fully aromatic, liquid crystalline polyesters are disadvantageous. Moreover, the long cross linking times (20 hours) at elevated temperatures and the subsequently required tempering of several hours are a disadvantage.

Liquid crystalline polyesters and polyester amides with fumaric acid units in the main polymer chain are disclosed in the U.S. Pat. No. 4,398,019. Further components are aliphatic dicarboxylic acids, aromatic hydrocarboxylic acids, diphenols and p-aminophenols. These polymers are random copolymers with various sequences. They are not suitable for cross linking reactions with retention of the liquid crystalline properties, since the stiffness is lost when the C=C double bond is split.

Methods to synthesize liquid crystalline polymers of regular structure with rigid and flexible units in the main polymer chain, which contain a reactive unsaturated group in the form of fumaric acid in the mesogenic group, are known from Makromol. Chemie, Rapid Communication vol. 6 (1985), No. 9 page 601. The disadvantage of this polyester is in that a reaction of the C=C double bond to a single bond, as would be the case with addition or cross linking reactions, leads to the loss of liquid crystalline properties due to a destabilization of the mesogenic group (Vysokomol. Soedin. B 24 (1987) 7, page 504). Likewise, liquid polyesters of regular structure, with long, saturated, uniform spacers, such as 1,10-dioxydecane or oligooxypropylene are known. They have a low melting point that is very advantageous for processing, but only have a limited range of applications because of their low melting point (Vysokomol. Soedin A 26 (1984) 12, page 2570).

No methods or means are disclosed in the known state of the art, as to how an unsaturated, liquid crystalline polyester amide of regular structure and having a sufficiently low melting point can be synthesized and cross linked with retention of the liquid crystalline properties.

DESCRIPTION OF THE INVENTION

It is therefore an object of the present invention to provide a method for the synthesis of regular, linear, thermotropic compounds with a sufficiently low melting point which, after having been processed, become infusible by cross linking and, at the same time, retain their advantageous liquid crystalline properties.

The invention is based on the task of synthesizing regular, linear, thermotropic, crosslinkable compounds from suitable starting materials.

This objective is accomplished in accordance with the present invention polymeric by synthesizing compounds containing recurring units of the formula

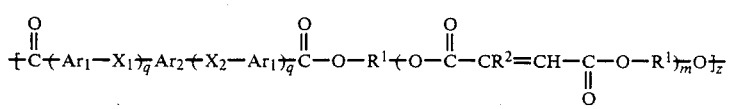

by the per se known method of high-temperature solution polycondensation, starting from a complex dicarboxylic acid chloride having the general structure

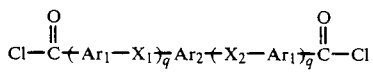  (II)

wherein
Ar₁ is

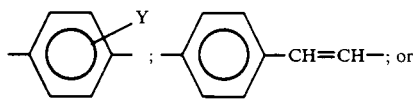

Ar₂ is

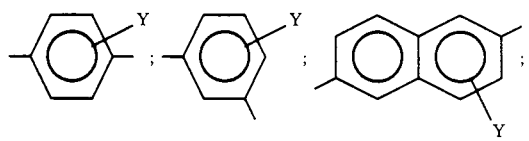

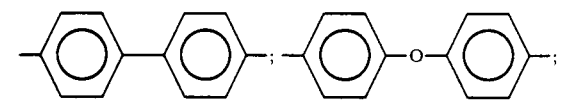

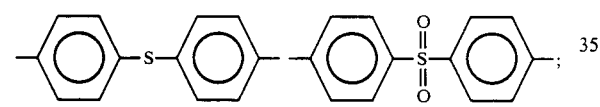

or 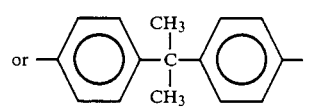

wherein
Y=H, F, Cl, CN, $C_nH_{2n+1}$, $OC_nH_{2n+1}$, phenyl,
n is a cardinal number from and 1 to 4 and,
when $X_1$ is OCO, then $X_2$ is COO,
if $X_1$ is CO), then $X_2$ is OCO,
when $X_1$ is NHCO, then $X_2$ is CONH,
when $X_1$ is CONH, then $X_2$ is NHCO, and
when $X_1$ is COO, then $X_2$ is OCO and q is a cardinal number from 1 to 5, and the dihydroxy component, which contains one or more unsaturated groups for the synthesis of a regular, linear, thermotropic, cross-linkable compound, is used in the form of an oligomer of the formula

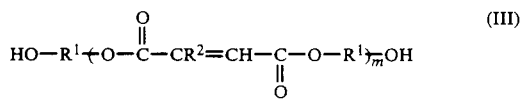  (III)

wherein
R¹ is a linear, aliphatic, saturated group having from 2 to 12 carbon atoms, or it is an oxyaliphatic group having from 4 to 10 carbon atoms,
R² is a hydrogen atom, or a methyl group, and
m is a cardinal number from 1 to 4.

The use of the oligomer is particularly significant, since the synthesis of the regular, thermotropic, cross-linkable compound, particularly the polyester or the polyester amide, is not possible from the individual components of aromatic hydroxycarboxylic acid, aromatic dicarboxylic acid, aromatic dihydroxy compounds, dicarboxylic acid, aliphatic diol, or the reactive derivatives by the known methods of the polycondensation from the individual monomers.

The oligomer is synthesized from an unsaturated dicarboxylic acid and the 2- to 10-fold excess of an aliphatic dihydroxy compound by a condensation reaction, which is customary for the synthesis of esters. The synthesis can be carried out in the melt, in solution, or by an azeotropic process.

The use of ann unsaturated dihydroxy compound of structure (III) enables receives double bonds to be introduced selective with respect to their number and position in the polyester and makes possible a subsequent cross linking reaction with retention of the liquid crystalline properties. For the polycondensation, the monoethylenically unsaturated or polyunsaturated dihydroxy compound is used together with the complex dicarboxylic acid chloride of formula (II) in the molar ratio of 1:5 to 5:1. Preferably, molar ratios of 1:2 to 2:1 are used, the equimolar ratio being the most advantageous.

In preferred embodiments of the invention, q=1

Ar₁ 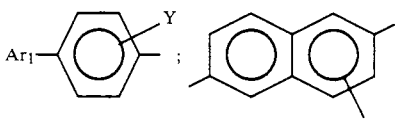

with Y = H

Ar₂

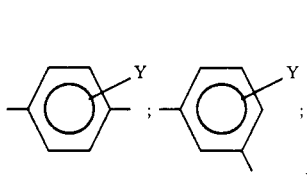

with the only proviso that when $X_1$=NHCO then $X_2$=CONH, and when $X_1$=CONH then $X_2$=NHCO—with Y=H, Cl, CH₃, OCH₃, R¹ in the oligomeric dihydroxy compound (III) is a chain of 2 to 8 methylene groups, R² is hydrogen or R¹(—CH₂—CR³—O—)ₛ with s=2 to 4, R³=H, CH₃ and R² hydrogen, m=1 and/or 2.

It is advantageous that, as complex dicarboxylic acid dichloride, terephthaloyl-bis-(4-oxybenzoyl chloride) or terephthaloyl-bis(4-aminobenzoyl chloride) and, as oligomeric dihydroxy component, dihydroxydialkyl fumarate with 4 to 8 carbon atoms in the alkyl chain are polycondensed for 1 to 2 hours in an equimolar ration at 170° to 220° C. in an inert solvent under an inert gas and the compound, especially the polyester or the polymer amide, is cross linked with 1 to 5 moles of styrene per mole of double bond in the polymer. As complex dicarboxylic acid dichloride, it is also possible to use N, N'-1,4-phenylene-bis-terephthalamido carboxylic acid chloride, 2,6-naphthyl-bis(4-aminobenzoyl chloride), O,O'-1,4-phenylene-bis-terephthaloyl carboxylic acid chloride, 2,6-naphthaloyl-bis-(4-oxybenzoyl chloride), or 1,4-dioxycarbonyl-2-chlorophenyl-bis-(4-benzoyl chloride). As solvents for the polycondensation, high boiling, inert materials or mixtures of materials, such as beta-chloronaphthalene, beta-methylnaphthalene, diphenyl ether or mixtures of aromatic compounds are used. The esterification is carried out at atmospheric pressure and at temperatures of 140° to 240° C. The reaction period is 0.5 to 4 hoursand vigorous stirring is required. The compound, especially the polyester or the polyester amide, is isolated by precipitation in a suitable solvent.

The polyester, so prepared, contains one or more monoethylenically unsaturated components, such as fumaric acid or substituted fumaric acid, per structural unit (I). Further components of the polyester are saturated aliphatic or oxyaliphatic diols, such as ethylene glycol, propylene glycol, 1,4-butanediol, 1,3-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethylene glycol, triethylene glycol, dipropylene glycol, tripropylene glycol, as well as single-ring or multi-ring aromatic hydroxycarboxylic acids, such as p-hydroxybenzoic acid, 6-hydroxynaphthalene-2-carboxylic acid, p-hydroxycinnamic acid, as well as their ring-substituted derivatives. The substituents may be alkyl groups with 1 to 4 carbon atoms, alkoxy groups with 1 to 4 carbon atoms, phenyl groups, halogens or cyano groups. Examples of these are 6-hydroxy-5-chloro-2-naphthalenecarboxylic acid, 6-hydroxy-5-methyl-2-naphthalenecarboxylic acid, 6-hydroxy-5-methoxy-2-naphthalenecarboxylic acid, 6-hydroxy-7-chloro-2naphthalenecarboxylic acid, 6-hydroxy-4,7-dichloro-2-naphthalenecarboxylic acid, etc. Preferred hydrocarboxylic acids are p-hydroxybenzoic acid and 6-hydroxy-2-naphthalene carboxylic acid. A further component of the polyester are single- or multi-ring aromatic dicarboxylic acids. The following units are named as examples:

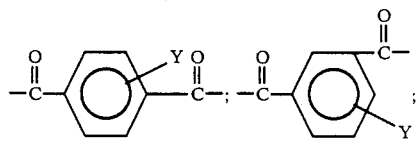

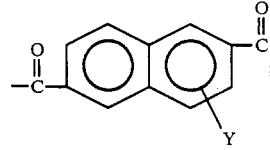

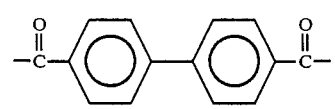

with Y=H, F, CL, CH, $C_nH_{2n+1}$, $OC_nH_{2n+1}$ phenyl, with n—1 to 4,

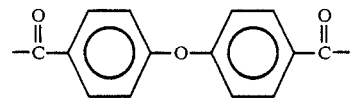

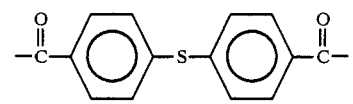

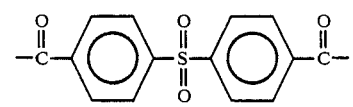

It is also possible to have mixtures of these dicarboxylic acids or substituents on the aromatic ring, such as alkyl groups with 1 to 4 carbon atoms, alkoxy groups with 1 to 4 carbon atoms, phenyl substituents, CN substituents or halogens. Preferably, however, substituted terephthalic acid and/or 2,6-naphthalenedicarboxylic acid are used. Finally, aromatic dihydroxy compounds are used. These are, for example, hydroquinone, resorcinol, 2,6-dihydroxynaphthalene, 4,4'-dihydroxydiphenyl, 4,4'-dihydroxydiphenyl ether, 4,4'-dihydroxydiphenyl sulfide, 4,4'-dihydroxydiphenyl sulfone or substituted compounds, such as chlorohydroquinone, methoxyhydroquinone, phenylhydroquinone, methylhydroquinone, ethylhydroquinone, cyanohydroquinone.

The melt of the polyester is anisotropic. The melting temperatures are lower than 200° C. The polyesters have a solution viscosity ranging from 0.250 to 0.930 dL/g, measured in phenol/tetrachlorethane.

Per structural unit (I), the polyester amide, so prepared, contains one or more monoethylenically unsaturated components, such as fumaric or substituted fumaric acid. Further components of the polyester amide are saturated aliphatic or oxyaliphatic diols, such as ethylene glycol, propylene glycol, 1,4-butanediol, 1,3-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethyl as well as one-ring and multi-ring aromatic aminocarboxylic acids, such as p-aminobenzoic acid, 6-aminonaphthalene-2-carboxylic acid, m-aminobenzoic acid, as well as their ring-substituted derivatives. The substituents may be alkyl groups with 1 to 4 carbon atoms, alkoxy groups with 1 to 4 carbon atoms, phenyl, 6-amino-5-methoxy-2-naphthalenecarboxylic acid, 1-amino-2-chloro-4-benzoic acid, etc. Preferred aminocarboxylic acid are p-aminobenzoic acid and m-aminobenzoic acid. A further component of the polyester amide are one-ring or multi-ring aromatic dicarboxylic acids. The following units are named as examples:

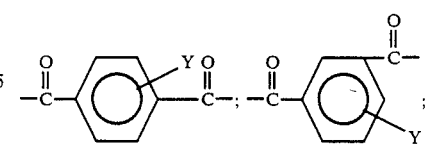

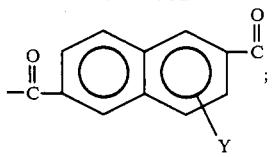

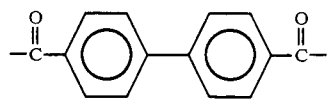

with Y=H, F, Cl, CN, $C_nH_{2n+1}$, $OC_nH_{2n+1}$, phenyl, with n=1 to 4,

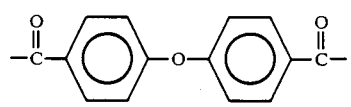

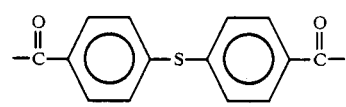

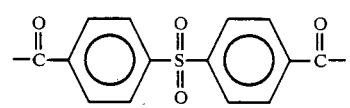

It is also possible to have mixtures of these dicarboxylic acids or substituents on the aromatic ring, such as alkyl groups with 1 to 4 carbon atoms, alkoxy groups with 1 to 4 carbon atoms, phenyl substituents, CN substituents or halogens. Preferably, however, unsubstituted terephthalic acid and/or 2,6-naphthalenedicarboxylic acid are used. Finally, aromatic diamino compounds are used, such as p-phenylenediamine, m-phenylenediamine, or structures of the form

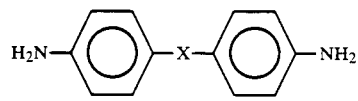

with X=—, O, CO, CH$_2$, S, SO$_2$ or substituted p-phenylenediamine with chloro, methyl, ethyl, methoxy, ethoxy, phenyl or cyano substituents. The melt of the polyester amides is anisotropic and the melting temperatures are lower than 250° C. The polyester amides have a solution viscosity in the range of 0.250 to 0.930 dL/g, measured in phenol/tetrachloroethane.

The compound, especially the polyester or the polyester amide, can be processed in the melt without cross linking with itself thermally in the processing temperature range. It is soluble in conventional solvents, such as chloroform, dichloroethane, tetrachloroethane, o-dichlorobenzene, dimethylformamide, cresol, n-methylpyrrolidone. The cross linking takes place in a known manner by heating and/or irradiation with UV, electron beam or gamma radiation in the presence of catalysts or sensitizers. As catalysts, peroxides, such as benzoyl peroxide, AIBN azobis (isobutyronitril) and di-t-butyl peroxide can be used. The addition of free radical polymerizable monomers, which are used to cross link conventional unsaturated polyesters, is also possible. These monomers are, for example, styrene, alpha-methylstyrene, p-divinylbenzene, vinyltoluene, 2-chlorostyrene, 2,5-dichlorostyrene, N-vinylpyrrolidone, 2-vinylpyridine, N-vinylcarbazole, vinyl acetate, acrylic acid, acrylate, methacrylic acid, methacrylate, butyl acrylate, monoesters of fumaric acid, diesters of fumaric acid, diesters of maleic acid, diallyl phthalate, diallyl terephthalate, dimethyl acrylamide, acrylonitrile, diallyl fumarate, triallyl cyanurate, dimethylallyl terephthalate. Cross linking is possible at any time as well as immediately after the synthesis of the compound, particularly of the polyester or the polyester amide, even after an interim storage of up to several years. For the cross linking reaction, the compound is dissolved in amounts of 0.1 to 5% by weight in a solvent, which is well capable of forming films and dissolves the polymer completely. Peroxide is added in amounts customary for the cross linking os unsaturated polyesters and/or the free radical polymerizable monomer is added in the ratio of 1:20 to 20:1 per mole of double bond in the polymers and a film is cast. Preferably, monomers are added in amounts of 1:10 to 10:1 per mole of double bond to the polymer. The compound, particularly the polyester or the polyester amide, may also be dissolved directly in the polymerizable monomer in the given ratio and a film cast, which is then cross linked. The compound without addition of monomers can be cross linked by tempering, for example, of the injection molded article in the mold at temperatures of 210° to 250° C. over a period of 5 to 240 minutes.

Surprisingly, it was noted that the cross linked films and molded articles are anisotropic and that this anisotropy is retained at temperatures far above the isotropic point of the uncrosslinked liquid crystalline polymers.

In a further development, the invention provides for a regular, linear, thermotropic, crosslinkable compound with mesogenic units and flexible spacers in the main polymer chain, which contains recurring units of the structure

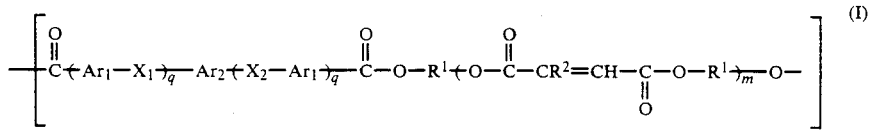

wherein AR$_1$ and AR$_2$ are the same as shown in the first herein, with Y=H, F, Cl, CN, phenyl, $C_nH_{2n+1}$, $OC_nH_{2n+1}$, with n=1 to 4, and, when X$_1$=OCO, X$_2$ must be COO,
when X$_1$=COO, X$_2$ must be OCO, when X$_1$=NHCO, X$_2$ must be CONH and when X$_1$=CONH, X$_2$ must be NHCO, and q may be 1 to 5, R$^1$ represents an aliphatic saturated group with 2 to 12 carbon atoms or an oxyaliphatic group (—CH$_2$—CHR$^3$—O—)$_s$ with s=2 to 4, R$^3$=H or CH$_3$ and m may be 1 to 4. Preferably, said compound is a regular, linear, thermotropic, crosslinkable polyester with mesogenic units and flexible spacers in the main polymer chain, having the general structure

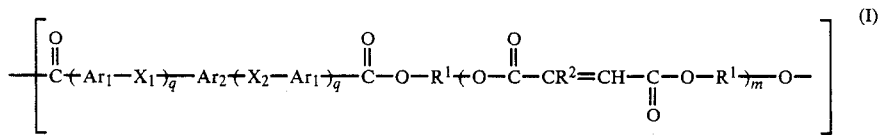

wherein
Ar$_1$ represents

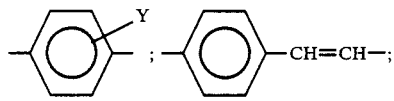

and Ar$_2$ represent

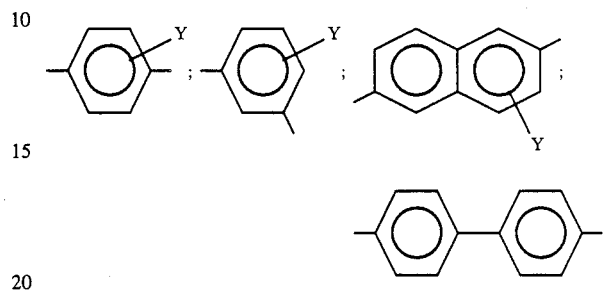

with Y=H, F, Cl, CN, phenyl, C$_n$H$_{2n+1}$, OC$_n$H$_{2n+1}$, with n=1 to 4, and, when X$_1$=OCO, X$_2$ must be COO and when X$_1$=COO, X$_2$ must be OCO, and q may be 1 to 5, R$^1$ represents an aliphatic saturated group with 2 to 12 carbon atoms or an oxyaliphatic group (—CH$_2$—CHR$^3$—O—)$_s$ with s=2 to 4, R$^3$=H or CH$_3$ and m may be 1 to 4. In a preferred embodiment, q=1, m=1 or 2, Ar$_1$ represents

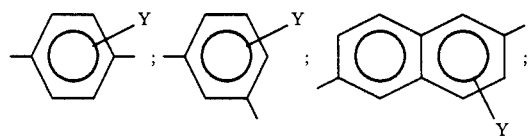

with Y=H
and Ar$_2$ represents

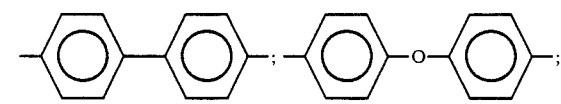

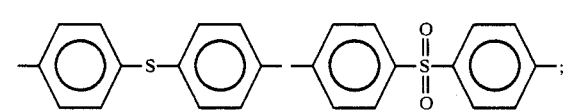

with Y=H, Cl, CH$_3$, OCH$_3$.

Moreover, a chain with 2 to 8 methylene groups, for example (—CH$_2$—CR$^3$—)$_s$ with R$^3$=H, CH$_3$ and s=2 to 4 can be used as R$^1$ and hydrogen as R$^2$.

Advantageously used are:
q=1, m=1, R$^1$=(—CH$_2$—)$_n$ with n=4 to 8
Ar$_1$=Ar$_2$=

with Y=H, X$_1$=COO, X$_2$=OCO
Ar$_1$=Ar$_2$=

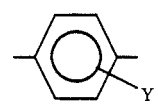

with Y=H, X$_1$=OCO, X$_2$=COO
Ar$_1$=

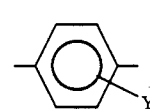

and Ar$_2$=

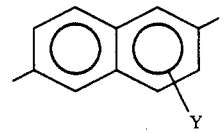

with Y=H, X$_1$=OCO, X$_2$=COO
Ar$_1$=

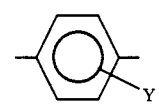

with Y=H and Ar₂=

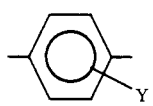

with Y=Cl, X₁=COO, X₂=OCO

The polyester can be cross linked by addition of cross linking agents or by supplying energy.

A further development of the invention comprises a regular, linear, thermotropic, crosslinkable polyester amide with mesogenic properties and flexible spacers in the main polymer chain, which has the general structure

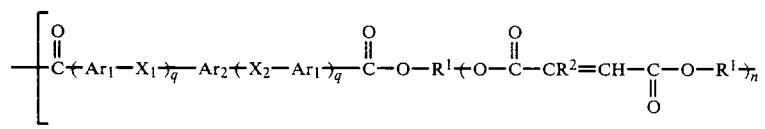

wherein
Ar₁ represents

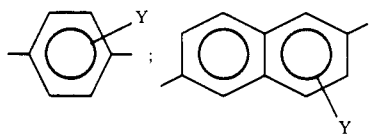

and Ar₂ represents

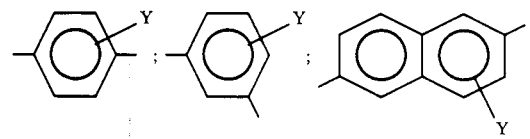

with Y=H, F, Cl, CN, phenyl, $C_nH_{2n+1}$, $OC_nH_{2n+1}$, with n=1 to 4, and, when X₁=NHCO, X₂ must be CONH and, when X₁=CONH, X₂ must be NHCO, and q may be 1 or 2, R¹ represents an aliphatic saturated group with 2 to 12 carbon atoms or an oxyaliphatic group ($-CH_2-CHR^3-O-$)ₛ with s=2 to 4, R³=H or CH₃ and m may be 1 to 4. In a preferred embodiment, q=1, m=1 or 2, Ar₁ represents

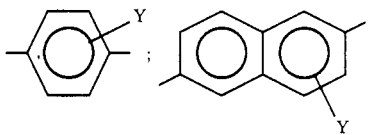

with Y=H
Ar₂ represents

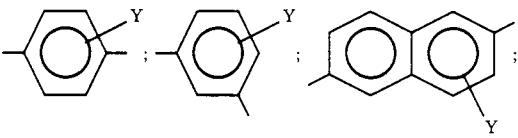

with Y=H, Cl, CH₃, OCH₃.

Moreover, a chain with 2 to 8 methylene groups, for example ($-CH_2-CR^3-O-$)ₛ with R³=H, CH₃ and s=2 to 4 can be used as R¹ and hydrogen as R².

Advantageously used are
Ar₁=Ar₂=

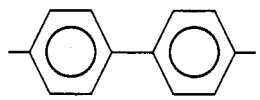

with Y=H, X₁=CNHCO and X₂=CONH
Ar₁=Ar₂=

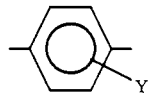

with Y=H, X₁=CONH and X₂=NCHO
Ar₁

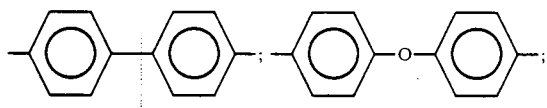

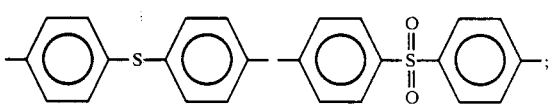

=Ar₂=

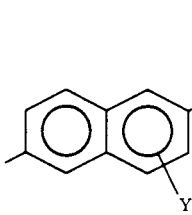

with Y=H, X₁=NHCO and X₂=CONH
Ar₁=

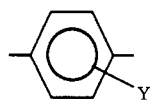

with Y=H and Ar₂=

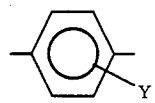

with Y=Cl, X₁=NHCO and X₂=CONH

The polyester amide can be cross linked by addition of cross linkers or by supplying energy.

The invention is described in greater detail below by means of several examples, it being understood that these examples are given by way of illustration and not by way of limitation. In the example means the symbol for solution viscosity (intrinnnsic viscosity) which determined with the inn, ubbelodne viscometer in a solution of 0.5 g/l polymer in prenol/tetrachlaroethene.

EXAMPLE 1

Fumaric acid (0.125 moles) and 2 moles of hexanediol are esterified azeotropically to dihydroxydihexyl fumarate in 300 mL toluene as entraining agent. The ester, purified by repeated reprecipitation has a melting point of 62° C.

IR (KBr) C=C: 3080 cm⁻¹, 990 cm⁻¹, C=C: 1720 cm⁻¹, OH: 3440 cm⁻¹.

For the polycondensation, 10 mmoles of terephthaloyl-bis-(4-aminobenzoyl chloride) as well as 10 mL of diphenyl ether are added to a 3-neck flask with nitrogen inlet, reflux condenser and stirrer. The mixture is flushed for about 15 minutes with nitrogen and subsequently polycondensed for 1 hour at 190° C. under nitrogen. The polymer is precipitated in hot toluene and filtered off with suction. After extraction with acetone in a Soxhlett apparatus, the polymer is dried for 12 hours under vacuum at 60° to 80° C. The polymer has a melting point of $T_m=187°$ C., $T_{ni}=203°$ C., $_{inn}=0.45$ dL/g in phenol/tetrachloroethane at 30° C. To the 1% polymer solution in chloroform, 2 moles of alpha-methylstyrene per mole of double bond are added and a film is cast. This film can be cross linked by tempering for 30 minutes at temperatures starting from 160° C. and rising to 200° C. The cross linked polymer is infusible and anisotropic to 260° C.

EXAMPLE 2

Dihydroxydioctyl fumarate ($T_m=59°$ C.) and terephthaloyl-bis-(4-aminobenzoyl chloride) are polycondensed in equimolar proportions by the method of Example 1. The polymer melts at 175° C. and becomes isotropic at 201° C. The solution viscosity was determined in phenol/tetrachloroethane at 30° C. and found to be 0.87 dL/g. After the cross linking, carrier out as in Example 1, the polymer is infusible and anisotropic to 245° C.

EXAMPLE 3

Dihydroxydihexyl fumarate and N, N'-p-phenylene-bis-(terephthalamido carboxylic acid chloride) are polycondensed in equimolar proportions by the method of Example 1. The polymer melts at 198° C. and becomes isotropic at 228° C. The polymer is melted in pure form and cross linked for 3 hours at 210° C. The cross-linked polymer is infusible, insoluble in conventional solvents and anisotropic until decomposition commences at 300° C.

EXAMPLE 4

Fumaric acid (0.125 moles) and 2 moles of hexanediol are esterified azeotropically to dihydroxydihexyl fumarate in 300 mL of toluene as entrapping agent. The polymer has a melting point of 140° C.; the melt is anisotropic. The transition temperature to the isotropic melt is at 180° C. The polyester has a solution viscosity of 0.35 dL/g in phenol, tetrachloroethane, measured at 30° C.

To form a crosslinkable film, 200 mg of polymer are dissolved in 13 mL of chloroform and 50 mg of styrene are added. The solution is poured onto a glass plate and the solvent is evaporated off. A thin, slightly cloudy film can be pulled off. It is cross linked by tempering for 15 minutes at 140° to 160° C. The cross linked film is anisotropic up to 250° C., infusible and insoluble in all conventional organic solvents, such as chloroform, dichloroethane, acetone, benzene, toluene, dichlorobenzene, etc.

EXAMPLE 5

Dihydroxydioctyl difumarate, $T_m=59°$ C., is synthesized from (0.125 moles) of fumaric acid and 2 moles of octanediol. The corresponding polymer is prepared as in Example 4. $T_m=142°$ C., $T_{ni}=160°$ C., $_{inn}=0.910$ dL/g. The film, prepared as in Example 1, becomes infusible after tempering and remains anisotropic up to 220° C.

EXAMPLE 6

Dihydroxydihexyl fumarate is subjected as in Example 4 to a polycondensation reaction with O,O'-1,4-phenylene-bis-terephthaloyl carboxylic acid chloride. The polyester has a melting point of $T_m=170°$ C. and becomes isotropic at $T_{ni}=185°$ C., $h_{inn}=0.850$ dL/g. The film, prepared as in Example 1, becomes infusible after tempering and remains anisotropic up to 230° C.

EXAMPLE 7

Dihydroxydihexyl fumarate is subjected as in Example 4 to a polycondensation reaction with 1,4-dioxycarbonyl-2-chlorophenylenedi(4-benzoyl chloride). The polyester has a melting point $T_m$ of 83° C. and becomes isotropic at $T_{ni}=160°$ C., $h_{inn}=0.63$ dL/g. The polyester (5 g) is melted and the melt is mixed at 100° C. with 1 g of styrene. The polyester is poured into a mold and cured for 45 minutes at 140° C. The cross liked polyester is infusible and anisotropic up to 200° C.

EXAMPLE 8

Dihydroxybutyl fumarate ($T_m=74°$ C.) is polycondensed as in Example 4 with 2,6-naphthaloyl-bis-(p-hydroxybenzoyl chloride). The polyester has a melting point $T_m$ of 174° C. and becomes isotropic at $T_{ni}=220°$ C., $h_{inn}=0.720$ dL/g.

The polyester is processed with alpha-methylstyrene into a film by the method of Example 4 and cross linked within 2 hours at 140° to 180° C. The cross linked film is anisotropic up to 250° C.

We claim:

1. A process for producing regular, linear, thermotropic crosslinkable polymers, which comprises (A) polycondensing a complex dicarboxylic dichloride having the formula

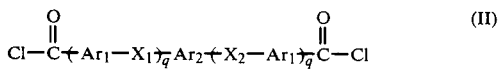

wherein
Ar₁ is

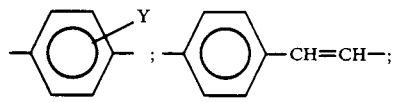

Ar₂ is

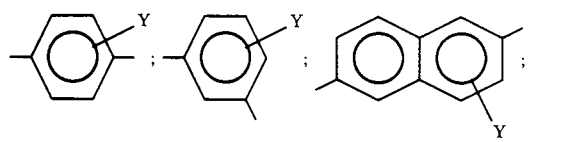

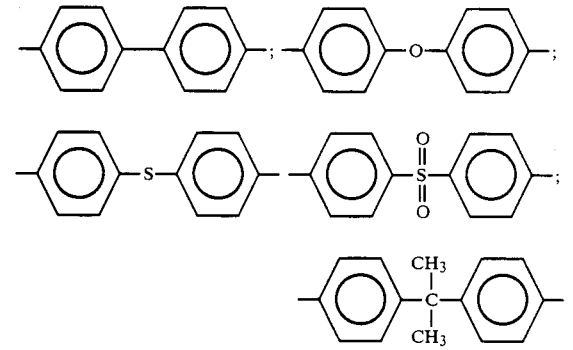

Y is H, F, Cl, CN, phenyl, $C_nH_{2n+1}$, or $OC_nH_{2n+1}$,
q is a cardinal number between 1 and 5, and
n is a cardinal number between 1 and 4;
provided that when $X_1=OCO$, then $X_2=COO$, when $X_1=COO$, then $X_2=OCO$, when $X_1=NHCO$ then $X_2=CONH$, and when $X_1=CONH$ then $X_2=NHCO$;
(B) with an unsaturated dihydroxy oligomeric compound of the formula (III)

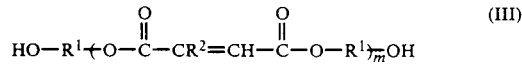

present as an oligomer, where $R^1$ is a linear, aliphatic, saturated $C_{2-12}$ moiety, or a $C_{4-10}$ oxyaliphatic moiety;
$R^2$ is a H or $CH_3$ moiety; and
m is a cardinal number between 1 and 4; at a mole ratio of from about 1:5 to about 5:1, at a temperature of from about 140° C. to about 240° C., for a time period from about 0.5 to 4 hours, under inert gas atmosphere, and crosslinking the polyester reaction product at a temperature from about 140° C. to about 180° C. with a crosslinking agent known per se and being present in a molar ratio of from about 1:20 to about 20:1 per mole double bond in the polymer.

2. A regular, linear, thermotropic crosslinkable polymer with mesogenic units and flexible spacers in the main polymer chain, having recurring units of the structure:

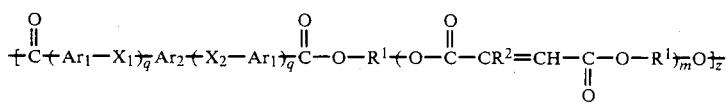

wherein
Ar₁ is

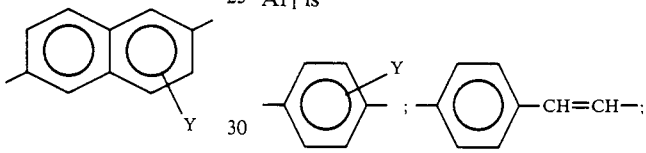

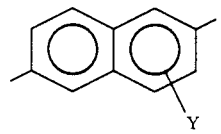

Ar₂ is

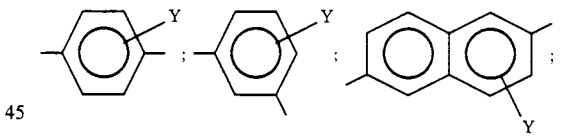

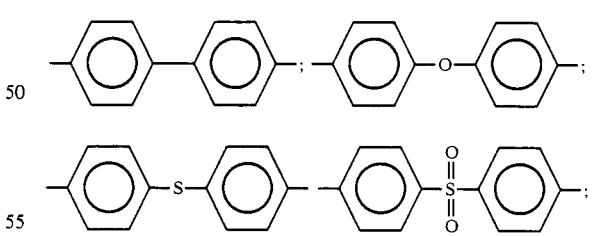

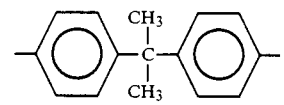

Y is H, F, Cl, CN, phenyl, $C_nH_{2n+1}$, $OC_{2n+1}$,
q is a cardinal number between 1 and 5,
n is a cardinal number between 1 and 4;
$R^1$ is a $C_{2-12}$ saturated aliphatic moiety, or the oxyaliphatic moiety $-(-CH_2-CHR^3-)-)_s-$ wherein s is a cardinal number between 2 and 4, and
$R^3$ is H or $CH_3$, provided that when $X_1$=OCO, then $X_2$=COO, when $X_1$=COO, then $X_2$=OCO, when $X_1$=NHCO then $X_2$=CONH, and when $X_1$=CONH then $X_2$=NHCO.

3. The process of claim 1, with the proviso that when $X_1$ is OCO, then $X_2$ is COO, and when $X_1$ is COO, then $X_2$ is OCO.

4. The process of claim 1, wherein $Ar_2$ is

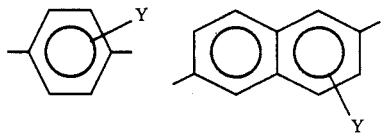

and q is a cardinal number between 1 and 2, with the proviso that when $X_1$ is NHCO, then $X_2$ is CONH, and when $X_1$ is CONH, then $X_2$ is NHCO.

5. The polymer of claim 2, with the proviso that when $X_1$ is OCO, then $X_2$ is COO, and when $X_1$ is COO, then $X_2$ is OCO.

6. The polymer of claim 2, wherein $Ar_1$ is

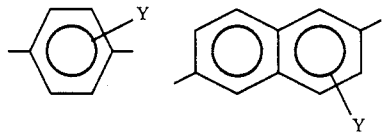

and q is a cardinal number between 1 and 2, with the proviso that when $X_1$ is NHCO, then $X_2$ is COHN, and when $X_1$ is COHN, then $X_2$ is NHCO.

* * * * *